United States Patent
Wei et al.

(10) Patent No.: US 11,777,541 B2
(45) Date of Patent: Oct. 3, 2023

(54) DIGITAL FINGERPRINT GENERATION CIRCUIT, GENERATION METHOD AND ELECTRONIC DEVICE

(71) Applicants: Beijing BOE Technology Development Co., Ltd., Beijing (CN); BOE TECHNOLOGY GROUP CO., LTD., Beijing (CN)

(72) Inventors: Xiangye Wei, Beijing (CN); Liming Xiu, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/330,561

(22) Filed: May 26, 2021

(65) Prior Publication Data
US 2022/0045703 A1    Feb. 10, 2022

(30) Foreign Application Priority Data

Aug. 7, 2020   (CN) .......................... 202010788358.0

(51) Int. Cl.
*H04B 1/04*   (2006.01)
*G06F 9/30*   (2018.01)
*G06F 1/10*   (2006.01)

(52) U.S. Cl.
CPC .............. *H04B 1/0475* (2013.01); *G06F 1/10* (2013.01); *G06F 9/30101* (2013.01); *H04B 2001/0491* (2013.01)

(58) Field of Classification Search
CPC .......... H04B 1/0475; H04B 2001/0491; G06F 9/30101; G06F 1/08
See application file for complete search history.

(56) References Cited

U.S. PATENT DOCUMENTS

| | | | | |
|---|---|---|---|---|
| 2006/0114069 A1* | 6/2006 | Kojima | ................... | H03L 7/113 331/16 |
| 2008/0315921 A1* | 12/2008 | Cha | ....................... | H03D 13/003 327/156 |
| 2016/0233870 A1* | 8/2016 | Van Engelen | ........ | H03L 7/0991 |
| 2017/0076138 A1* | 3/2017 | Bartels | .................... | G06V 10/42 |
| 2017/0272182 A1* | 9/2017 | Sen | ........................ | H04K 3/825 |
| 2018/0048232 A1* | 2/2018 | Adell | ..................... | H02M 3/158 |
| 2019/0089360 A1* | 3/2019 | Roham | ................. | H03L 7/0995 |
| 2021/0067166 A1* | 3/2021 | Liu | ........................ | H03L 7/0995 |

OTHER PUBLICATIONS

Wireless Device Identification using Oscillator Control Voltage as RF Fingerprint—Mahzad Azamehr, Ankit Mehta and Rashid Rashidzadeh—2017 IEE 30th Canadian Conference on Electrical and Computer Engineering (CCECE) (Year: 2017).*

* cited by examiner

*Primary Examiner* — Dac V Ha
(74) *Attorney, Agent, or Firm* — XSENSUS LLP

(57) ABSTRACT

Embodiments of the present disclosure provide a circuit and a method for digital fingerprint generation, and an electronic device. The digital fingerprint generation method includes inputting an input signal from outside; generating a frequency relationship indication signal between an input signal and a feedback signal; generating a frequency control signal based on the frequency relationship indication signal; generating an intermediate signal based on a frequency control signal and pulse signals; dividing the intermediate signal in frequency to generate the feedback signal; and generating a digital fingerprint based on the input signal and the feedback signal.

18 Claims, 5 Drawing Sheets

DIGITAL FINGERPRINT GENERATION CIRCUIT, GENERATION METHOD AND ELECTRONIC DEVICE

CROSS-REFERENCE TO RELATED APPLICATION

The present application claims the benefit of and priority to Chinese Patent Application No. 202010788358.0 filed on Aug. 7, 2020, which is incorporated herein by reference in its entirety.

TECHNICAL FIELD

The present disclosure relates to the field of digital encryption and, specifically, to a digital fingerprint generation circuit, a digital fingerprint generation method, and an electronic device.

BACKGROUND

With the rapid development of Internet of Things (IoT), the number of terminal devices is increasing exponentially. These devices are constantly operating in information collection, processing, and communication, placing higher requirements on security of communication. Digital fingerprinting can be based on physically unclonable function (PUF), where PUF uses physical changes that occur naturally during device manufacturing, thus making it possible to distinguish between otherwise identical devices. The circuit generates a unique output value that can remain constant over time, under different temperatures and operating voltage conditions, and thus can be used as a unique identifier for a device that is helpful for information acquisition and verification or encryption of communication between devices.

SUMMARY

The present disclosure provides a digital fingerprint generation circuit, the digital fingerprint generation circuit comprising:
a pulse generation sub-circuit, configured to generate a plurality of pulse signals; a digital control oscillator sub-circuit, configured to generate an intermediate signal based on a frequency control signal and the pulse signals;
a frequency dividing sub-circuit, configured to divide the intermediate signal in frequency to generate a feedback signal;
a frequency and phase detection sub-circuit, configured to generate a digital fingerprint based on an input signal and the feedback signal, and further configured to generate a frequency relationship indication signal between the input signal and the feedback signal; and
a control sub-circuit, configured to generate the frequency control signal based on the frequency relationship indication signal.

In some embodiments, the frequency and phase detection sub-circuit is further configured to generate the frequency relationship indication signal by generating a phase relationship indication signal between the input signal and the feedback signal.

In some embodiments, the pulse generation sub-circuit is a ring oscillator comprising a NAND gate.

In some embodiments, the digital control oscillator sub-circuit comprises a logic control sub-circuit, an input terminal and an output terminal. The logic control sub-circuit is configured to generate a selection signal based on the frequency control signal. The input terminal is configured to receive the plurality of pulse signals and the selection signal, and to select and synthesize among the plurality of pulse signals based on the selection signal to generate a synthesized signal. The output terminal comprises a trigger circuit, the trigger circuit being configured to receive the synthesized signal, and to generate the intermediate signal based on the synthesized signal and a clock signal.

In some embodiments, the frequency and phase detection sub-circuit comprises:
a first input terminal, configured to receive the input signal;
a second input terminal, configured to receive the feedback signal;
a frequency divider, configured to divide the input signal in frequency;
a register sub-circuit, configured to obtain a plurality of signal values for an output signal from frequency divider at a plurality of edges of the feedback signal; an output terminal, configured to output a bit stream as the digital fingerprint; and a logic sub-circuit, configured to perform logic operations on a plurality of signal values output by the register sub-circuit to generate the frequency relationship indication signal.

In some embodiments, a D flip-flop in the register sub-circuit is connected to the frequency divider, wherein the D flip-flop is configured to output a digital fingerprint based on an output signal of the frequency divider.

An embodiment of the present disclosure also provides a digital fingerprint generation method, comprising:
step S10: inputting an input signal from outside;
step S20: generating a frequency relationship indication signal between the input signal and a feedback signal;
step S30: generating a frequency control signal based on the frequency relationship indication signal;
step S40: generating an intermediate signal based on the frequency control signal and pulses;
step S50: dividing the intermediate signal in frequency to generate the feedback signal; and
step S60: generating a digital fingerprint based on the input signal and the feedback signal.

In some embodiments, the digital fingerprint generation method further comprises: generating the frequency relationship indication signal by generating a phase relationship indication signal between the input signal and the feedback signal.

In some embodiments, the input signal is generated by an external crystal, or a microelectromechanical system (MEMS), or a pulse generated by a pulse generator such as an on-chip ring oscillator (RO).

In some embodiments, the frequency range of the input signal is not within the operating frequency of the digital control oscillator sub-circuit.

In some embodiments, it is also possible to graphically display a bit stream as the digital fingerprint, visualize the digital fingerprint or perform a Fourier transform to generate a visualized digital fingerprint.

An embodiment of the present disclosure also provides an electronic device comprising the digital fingerprint generation circuit described above.

BRIEF DESCRIPTION OF THE DRAWINGS

In order to more clearly illustrate the technical solution in embodiments of the present disclosure, the following is a brief description of the accompanying drawings to be used in the description of embodiments. It is understood that the following description of the accompanying drawings is only about some embodiments of the present disclosure. For those of ordinary skills in the art, without creative work, other drawings can be obtained according to these accompanying drawings.

DETAILED DESCRIPTION

In order to make the purpose, technical solution, and advantage of embodiments of the present disclosure more clear, the technical solution of embodiments of the present disclosure will be clearly and completely described below in conjunction with the accompanying drawings of embodiments of the present disclosure. Understandably, the described embodiments are only some embodiments of the present disclosure, but not all of them. Based on the described embodiments of the present disclosure, all other embodiments obtained by those of ordinary skills in the art without creative labor shall fall within the protection scope of the present disclosure.

The terms used herein to describe embodiments of the present disclosure are not intended to limit and/or restrict the scope of the present disclosure. For example, unless otherwise defined, technical terms or scientific terms used in the present disclosure shall have the ordinary meaning as understood by those having ordinary skills in the art to which the present disclosure pertains. It is to be understood that the terms "first," "second," and the like as used in the present disclosure do not indicate any order, number, or importance, but are used only to distinguish between different components. Unless the context clearly indicates otherwise, the singular forms "one," "one," or "the" and similar words also do not indicate a numerical limitation, but rather the presence of at least one.

It will be further understood that the terms "include" or "contain" and the like are intended to mean that the element or object appearing before the word covers the element or object appearing after the word and its equivalent, without excluding other elements or objects. Similar words such as "connection" or "coupling" are not limited to physical or mechanical connections, but may include electrical connections, whether direct or indirect. The terms "up", "down", "left", "right", etc. are used only to indicate relative position relationships, and when the absolute position of the object being described is changed, the relative position relationship may also be changed accordingly.

Figure 1:
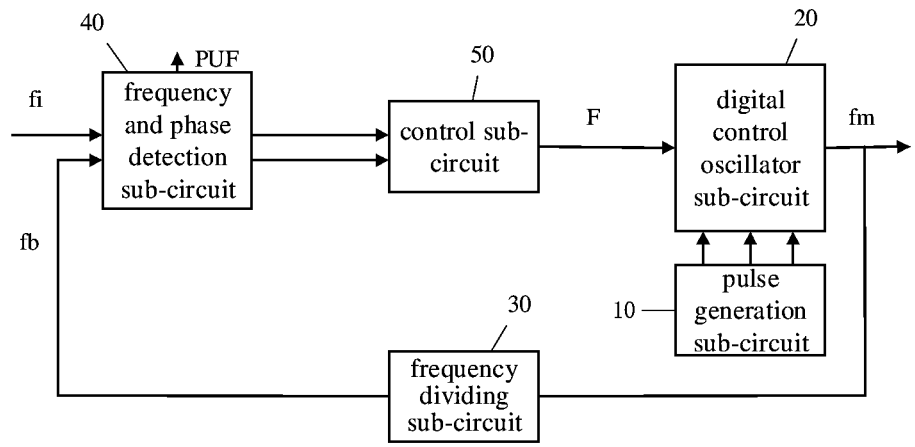
FIG. 1 is a schematic block diagram of a digital fingerprint generation circuit provided by an embodiment of the present disclosure.

FIG. 1 is a schematic block diagram of a digital fingerprint generation circuit provided by an embodiment of the present disclosure. The digital fingerprint generation circuit includes a pulse generation sub-circuit 10, a digital control oscillator sub-circuit 20, a frequency dividing sub-circuit 30, a frequency and phase detection sub-circuit 40, and a control sub-circuit 50.

The pulse generation sub-circuit 10 is configured to generate K pulse signals and output the generated K pulse signals to the digital control oscillator sub-circuit 20. Optionally, in an embodiment of the present disclosure, the pulse generation sub-circuit may be a ring oscillator (RO) that generates K pulse signals with the same phase spacing.

The digital control oscillator sub-circuit 20 is configured to generate and output an intermediate signal fin based on the frequency control signal F and the pulse signals input from the pulse generation sub-circuit 10. The intermediate signal fin is output as an output signal to the next stage circuit, and is also used as an input signal to the frequency dividing sub-circuit 30 for frequency dividing.

The frequency dividing sub-circuit 30 is configured to divide the output signal fin in frequency, such as dividing the output signal by 1/N in frequency, where N is a positive integer set according to the actual situation. Thus, the feedback signal fb is generated and sent to the frequency and phase detection sub-circuit 40.

The frequency and phase detection sub-circuit 40 is configured to generate a frequency relationship indication signal between the input signal fi and the feedback signal fb (for example, to generate the frequency relationship indication signal by generating a phase relationship indication signal between the input signal fi and the feedback signal fb), and to generate a digital fingerprint based on the inherent jitter in the input signal fi and the feedback signal fb. The inherent jitter in a signal is an offset of a signal change that occurs over a certain period of time of a digital signal or a periodic signal change of a digital signal with relative to an ideal signal. The inherent jitter in an embodiment of the present disclosure is primarily the phase variation of a signal pulse, However, in other embodiments of the present disclosure it may also be a variation in frequency, amplitude, etc. relative to the ideal signal.

In an embodiment of the present disclosure, the input signal fi input from outside can be generated by an external crystal, or by a Micro-Electro-Mechanical System (MEMS), or by a pulse generator with fixed physical characteristics such as an on-chip ring oscillator (RO).

The control sub-circuit 50 is configured to generate a frequency control signal F based on the frequency relationship indication signal output from the frequency and phase detection sub-circuit 40 and send it to the digital control oscillator sub-circuit 20.

Figure 2:
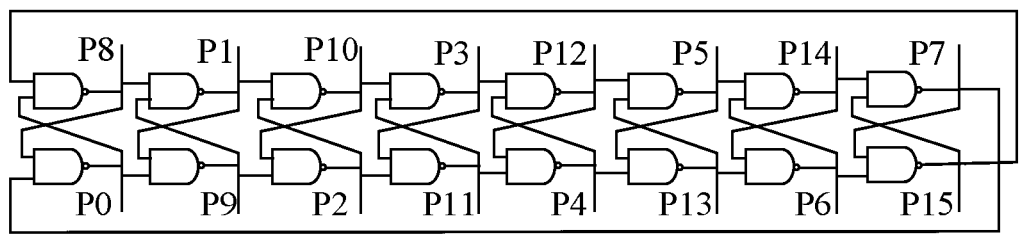
FIG. 2 is a schematic diagram of a ring oscillator provided by an embodiment of the present disclosure.

FIG. 2 is a schematic diagram of the pulse generation sub-circuit provided by an embodiment of the present disclosure when it is a ring oscillator. As shown in FIG. 2, the ring oscillator includes a cascaded 8-stage NAND gate sub-circuit (P0 to P15), each stage including a pair of NAND gates. In an ideal state, these NAND gates are identical and will output K ideal pulses with uniform phase difference.

Figure 3:
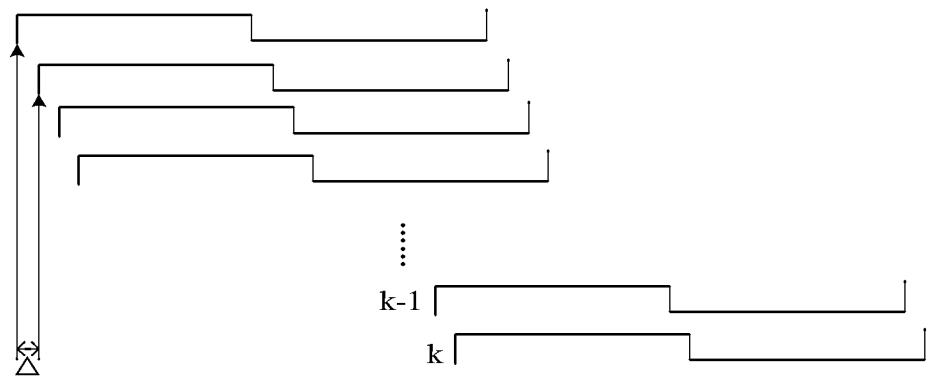
FIG. 3 is a schematic diagram of an ideal pulse generated by the pulse generation sub-circuit provided by an embodiment of the present disclosure.

FIG. 3 is a schematic diagram of the ideal pulses generated by the pulse generation sub-circuit provided by an embodiment of the present disclosure. The phase difference Δ between two adjacent pulses can satisfy:

$$\Delta = T/k = 1/k*f \quad (1)$$

where k is the number of pulses, T is the period of each pulse, and f is the frequency of each pulse. Therefore, the pulse generation sub-circuit can also be referred to as a k-inputs circuit.

Optionally, the number of pulses k that the pulse generation sub-circuit 10 is capable of generating may be preconfigured in the pulse generation sub-circuit 10. For example, it may be set in the pulse generation sub-circuit by a user (e.g., a developer) at the time of production of such pulse generation sub-circuit 10, where k is an integer multiple of 2.

At the time of design, theoretically, the physical parameters of the NAND gates in the pulse generation sub-circuit 10 need to be identical in order to output pulses with uniform phase difference as in FIG. 3. However, due to process errors at the time of manufacture, each NAND gate has differences in physical parameters such as conductivity, leakage, etc. This may cause its output pulse signal to deviate from the ideal pulse with uniform phase difference as in FIG. 4. This deviation is determined by the different physical characteristics of the NAND gates in the circuit, and pulses generated by each pulse generation sub-circuit 10 contain inherent jitter caused by such device inherent characteristics. The inherent jitter in the pulses generated by the pulse generation sub-circuit 10 can be extracted to generate a digital fingerprint of a device.

Figure 4:
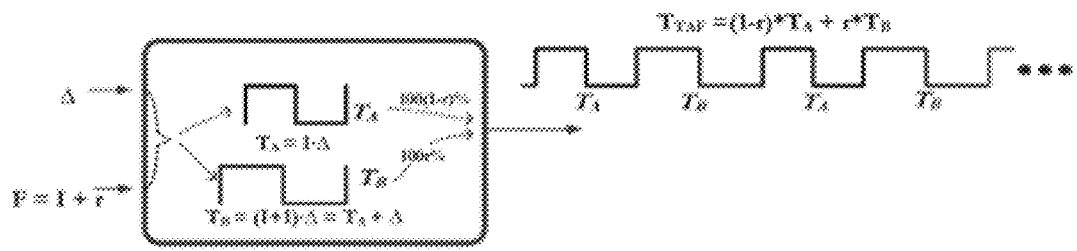
FIG. 4 is a schematic diagram in operation of the digital control oscillator sub-circuit provided an embodiment of the present disclosure.

FIG. 4 is a schematic diagram in operation of the digital control oscillation sub-circuit provided by an embodiment of the present disclosure. The digital control oscillator sub-circuit 20 generates an intermediate signal based on a Time Average Frequency (TAF), which can synthesize two or more pulses into a pulse signal of a specific frequency. Taking two signals as an example, the input signals of the digital control oscillator sub-circuit have a first cycle TA and a second cycle TB, respectively, corresponding to the pulses generated by the pulse generation sub-circuit and the pulse sent by the control sub-circuit in an embodiment of the present disclosure. The output signal TAF satisfies:

$$T_{TAF} = (1-r)T_A + rT_B \quad (2)$$

where $T_{TAF}$ is the output pulse, $T_A$ and $T_B$ are two periods, and r represents the occurrence probability of $T_B$.

The digital control oscillator sub-circuit 20 can generate pulses of arbitrary frequency to fit the input pulse by controlling in magnitude of the frequency control signal F, as in the following equation:

$$T_{TAF} = F \cdot \Delta = (I+r) \cdot \Delta = I \cdot \Delta - I \cdot r \cdot \Delta + I \cdot r \cdot \Delta + r \cdot \Delta = (1-r) \cdot I \cdot \Delta + r \cdot (I+1) \cdot \Delta = (1-r)T_A + rT_B \quad (3)$$

where F=I+r, I is an integer, r is a fractional number between 0 and 1, and Δ is the phase difference between adjacent ones of the K input pulses.

Figure 5:
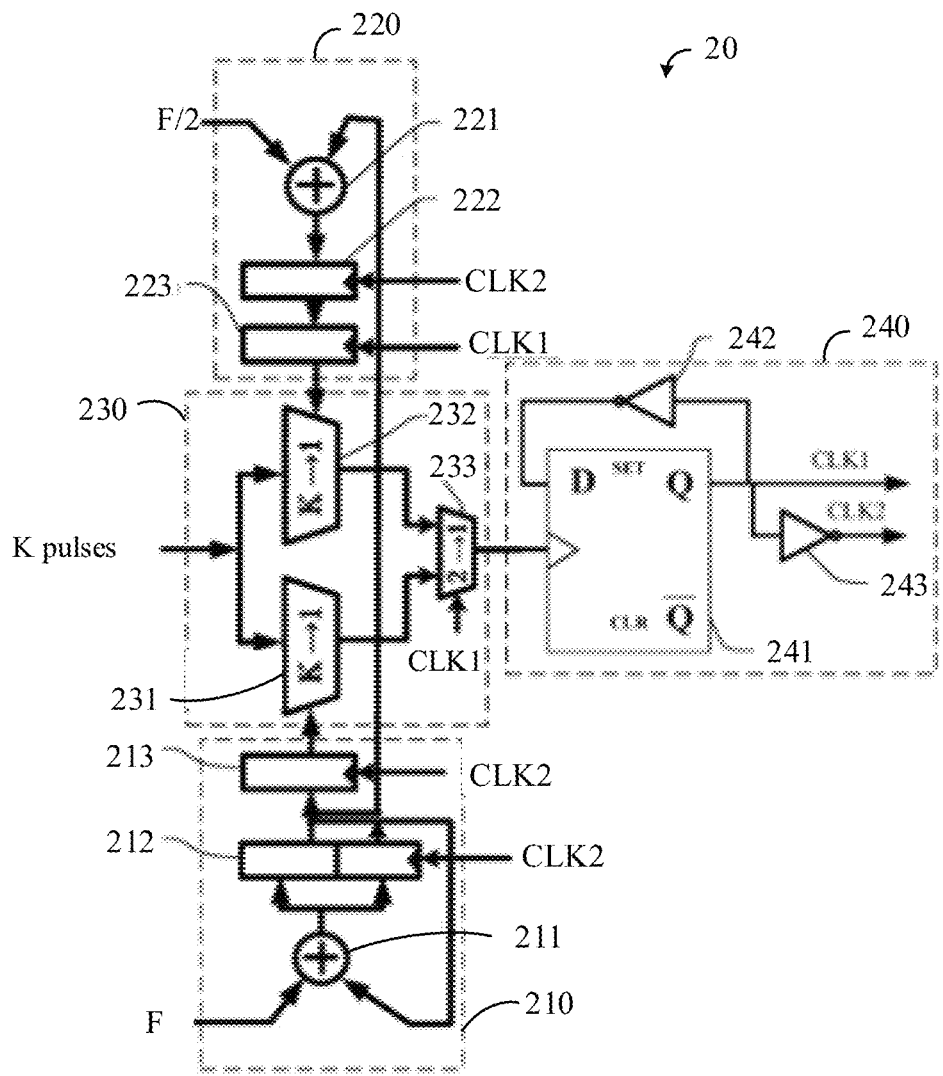
FIG. 5 is a circuit diagram of the digital control oscillator sub-circuit provided by an embodiment of the present disclosure.

FIG. 5 is a circuit diagram of the digital control oscillator sub-circuit provided by an embodiment of the present disclosure. As shown in FIG. 5, the digital control oscillator sub-circuit includes a first logic control sub-circuit 210, a second logic control sub-circuit 220, an input terminal 230, and an output terminal 240.

The first logic control sub-circuit 210 and the second logic control sub-circuit 220 are configured to generate a selection signal based on the frequency control signal.

The input terminal 230 is configured to receive K pulse signals and a selection signal, and to select and synthesize among the K pulse signals based on the selection signal to generate a synthesized signal.

The output terminal 240 comprising a trigger circuit, wherein the trigger circuit is configured to receive the synthesized signal and to generate the intermediate signal based on the synthesized signal and a clock signal.

The first logic control sub-circuit 210 includes a first adder 211, a first register 212 and a second register 213. The second logic control sub-circuit 220 may include a second adder 221, a third register 222 and a fourth register 223. The input terminal 230 includes a first K→1 multiplexer 231, a second K→1 multiplexer 232 and a 2→1 multiplexer 233. the first K→1 multiplexer 231 and the second K→1 multiplexer 232 are configured to receive K (K is an integer multiple of 2) pulses which are evenly spaced in phase from the pulse generation sub-circuit 10, respectively. The 2-1 multiplexer 233 is configured to receive the pulse signal selected by the K→1 multiplexers 231, 232 and a first clock signal CLK1 for synthesizing and sending to the output terminal 240.

The output terminal 240 includes a trigger circuit, and the trigger circuit is configured to generate pulses. The trigger circuit includes a D flip-flop 241, a first inverter 242 and a second inverter 243. D flip-flop 241 is configured to receive the pulse signal synthesized from the 2→1 multiplexer 233. The first inverter 242 receives the first clock signal CLK1 and outputs a signal to the D flip-flop 241. The second inverter 243 receives the first clock signal CLK1 and outputs a second clock signal CLK2.

In operation, the first adder 211 may add the frequency control signal F and the most significant bits (e.g., 5 bits) stored in the first register 3212, and then save the result of adding into the first register 212 at the rising edge of the second clock signal CLK2. Alternatively, the first adder 211 may add the frequency control signal F and all the information stored in the first register 212, and then save the result of adding into the first register 212 at the rising edge of the second clock signal CLK2. At the next rising edge of the second clock signal CLK2, the most significant bits stored in the first register 212 will be stored in the second register 213, and used further as a selection signal of the first K→1 multiplexer 231, for selecting a pulse from the K pulses as the output signal of the first K→1 multiplexer 231.

For example, the second adder 221 may add the frequency control signal F/2 and the most significant bits stored in the first register 212, and then save the result of adding into the third register 222 at the rising edge of the second clock signal CLK2. At the rising edge of the first clock signal CLK1, the information stored in the third register 222 is stored into the fourth register 223, and used further as the selection signal of the second K→1 multiplexer 232 for selecting a pulse from the K pulses as the output signal of the second K→1 multiplexer 232.

The 2→1 multiplexer 233 can synthesize the output signals of the first K→1 multiplexer 231 and the second K→1 multiplexer 232 at the rising edge of the first clock signal CLK1, so as to use as the input signal of the D flip-flop 241.

Theorically, the K→1 multiplexer 231 and the K→1 multiplexer 232 are identical, and the K signals have the same delay through the digital control oscillator sub-circuit 20 regardless of which signal is selected by the K→1 multiplexer. But in practice, due to process errors in manufacturing, the physical properties of each multiplexer are not exactly the same, resulting in inconsistent delays of the signal through various paths. This adds inherent jitter to the synthesized pulse later. Also, these inherent characteristics of the physical parameters of the multiplexer itself are different because of random errors in processing. The inherent characteristics of each digital control oscillator sub-circuit 20 are not the same, resulting in different inherent jitter in the output signal, which can be extracted to generate a digital fingerprint of a device.

In some embodiments, the number of input pulses can be increased or the number of multiplexers can be increased so as to enhance the inherent jitter of the output signal. This is more conducive to extracting the inherent characteristics of a device so as to generate a digital fingerprint.

In some embodiments, the frequency dividing sub-circuit 30 uses a frequency divider to divide the intermediate signal fm in frequence, for example to perform 1/N division, and send to the frequency and phase detection sub-circuit.

Figure 6:
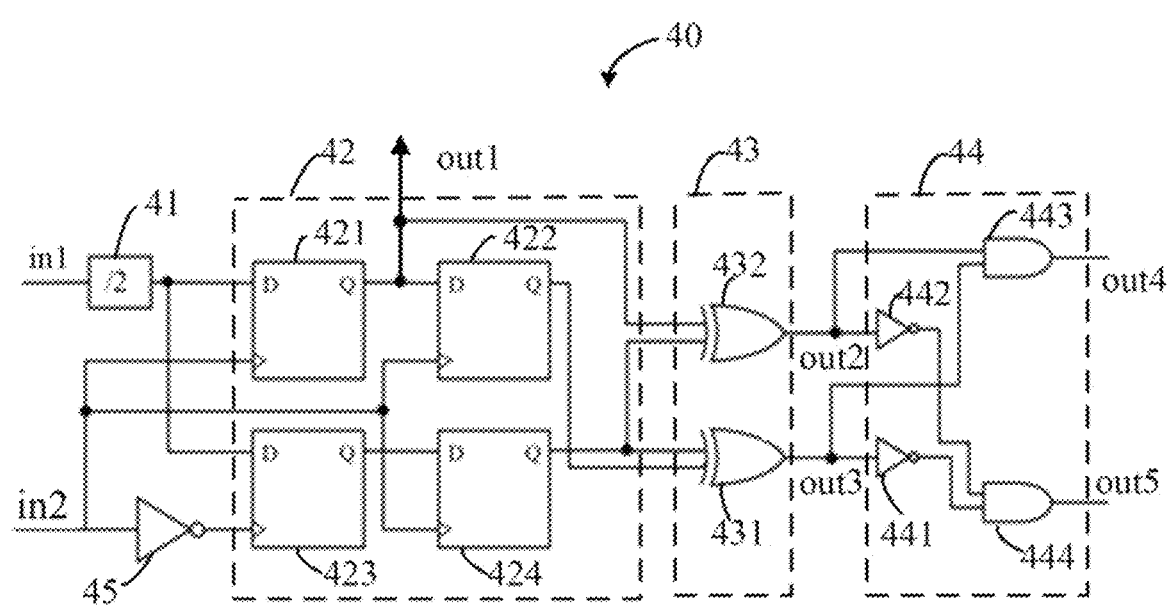
FIG. 6 is a circuit diagram of the frequency and phase detection sub-circuit provided by an embodiment of the present disclosure.

FIG. 6 is a circuit diagram of the frequency and phase detection sub-circuit provided by an embodiment of the present disclosure. As shown in FIG. 6, the frequency and phase detection sub-circuit 40 uses a phase frequency detector (PFD). The frequency and phase detection sub-circuit 40 includes a first input terminal in1, a second input terminal in2, a first output terminal out1, a second output terminal out2, a third output terminal out3, a fourth output terminal out4, a fifth output terminal out5, a frequency divider 41, a register sub-circuit 42, a first logic sub-circuit 43, and a second logic sub-circuit 44.

The first input terminal in1 is configured to receive an input signal with a frequency fi. In an embodiment of the present disclosure, the input signal fi can be a frequency signal generated by an external crystal, or a signal generated by a Micro-Electro-Mechanical System (MEMS), or a pulse generator with fixed physical characteristics, such as a pulse signal generated by an on-chip ring oscillator (RO). The input signal as generated has an inherent jitter generated in response to the inherent characteristics.

The second input in2 is configured to receive the feedback signal fb.

The frequency divider 41 is configured to divide the input signal in frequency.

The register sub-circuit 42 is configured to obtain a plurality of signal values for the output signal of the frequency divider 41 at a plurality of edges of the feedback signal. For example, the signal values of the frequency divider 41 at two adjacent rising edges of the feedback signal and at a falling edge between the two rising edges are obtained.

For example, the register sub-circuit 42 includes a first D flip-flop 421, a second D flip-flop 422, a third D flip-flop 423 and a fourth D flip-flop 424. An input end of the first D flip-flop 421 and an input end of the third D flip-flop 423 are both connected to an output end of the frequency divider 41. An input end of the second D flip-flop 422 is connected to an output end of the first D flip-flop 421. An input terminal of the fourth D flip-flop 424 is connected to an output end of the third D flip-flop 423. A clock end of the first D flip-flop 421, a clock end of the second D flip-flop 422 and a clock end of the fourth D flip-flop 424 are all connected to the second input terminal in2. A clock terminal of the third D flip-flop 423 is connected to the second input terminal through the first NOT gate 45.

In an embodiment provided by the present disclosure, an output end of the first D flip-flop 421 is connected to the first output terminal out1, and the digital bit stream output by the first output terminal out1 is use as a digital fingerprint.

The first logic sub-circuit 43 includes a first XOR gate 431 and a second XOR gate 432. Two input ends of the first XOR gate 431 are connected to an output end of the second D flip-flop 442 and an output end of the fourth D flip-flop 424, respectively. Two input ends of the second XOR gate 432 are connected to an output end of the first D flip-flop 421 and an output end of the fourth D flip-flop 424, respectively. An output end of the second XOR gate 432 is connected to the second output terminal out2. An output end of the first XOR gate 431 is connected to the third output terminal out3. The second logic sub-circuit 44 includes a second NOT gate 441, a third NOT gate 442, a first AND gate 443 and a second AND gate 444. Two input ends of the first AND gate 443 are connected to the second output terminal out2 and the third output terminal out3, respectively. One of the input ends of the second AND gate 444 is connected to the third output terminal out3 through the second NOT gate 441, and the other of the output ends of the second AND gate 444 is connected to the second output terminal through the third NOT gate 442.

The first logic sub-circuit 43 is connected to the third output terminal out2 and the second output terminal out3. The first logic sub-circuit 43 is configured to perform logic operations on a plurality of signal values output by the register sub-circuit 42, and to set the phase relationship indication signal as a first digital signal when the phase of the input signal is ahead of the phase of the feedback signal, and to set the phase relationship indication signal as a second digital signal. When the phase of the input signal lags behind the phase of the feedback signal. The second logic sub-circuit 44 is connected to the fourth output terminal out4 and the fifth output terminal out5. The second logic sub-circuit 44 is configured to perform logic operations on the output signals from the second output terminal out2 and the third output terminal out3, and to set the frequency relationship indication signal as the first digital signal when the frequency of the input signal is greater than the frequency of the feedback signal, and to set the frequency relationship indication signal as the second digital signal when the frequency of the input signal is smaller than the frequency of the feedback signal.

In some embodiments, the first digital signal is represented by 1 and the second digital signal is represented by 0.

The control sub-circuit generates the frequency control signal based on the frequency relationship indication signal.

An embodiment of the present disclosure provides a frequency and phase detection circuit. When an input signal fi is determined, the digital fingerprint generation circuit reaches a stable state and frequency fi of the input signal coincides with frequency fb of the feedback signal. When the digital control oscillator sub-circuit 20 tracks the input signal, the inherent jitter is reflected in the signal output from the frequency and phase detector. According to an embodiment of the present disclosure, the digital bit stream output from the first output terminal out1 is used as the digital fingerprint.

Accordingly, an embodiment of the present disclosure further provides a digital fingerprint generation method. The digital fingerprint generation method comprises the following steps S10 to step S60:

Step S10: inputting an input signal from outside;

Step S20: generating a frequency relationship indication signal between the input signal and the feedback signal;

Step S30: generating a frequency control signal based on the frequency relationship indication signal;

Step S40: generating an intermediate signal based on frequencies of the frequency control signal and pulses;

Step S50: dividing the intermediate signal in frequency to generate the feedback signal; and Step S60: generating a digital fingerprint based on the input signal and the feedback signal.

In some embodiments, when the frequency of the input signal fi is not within the operating frequency range of the digital control oscillator sub-circuit 20, the control sub-circuit 50 will keep changing the frequency control signal F to try to track the input frequency, the frequency control signal F jumping cyclically between 0 and 2K. In this case, all the inherent jitter of the signal in the circuit will be amplified, and the digital fingerprint output by the frequency and phase detection sub-circuit is more accurate.

Figure 7:
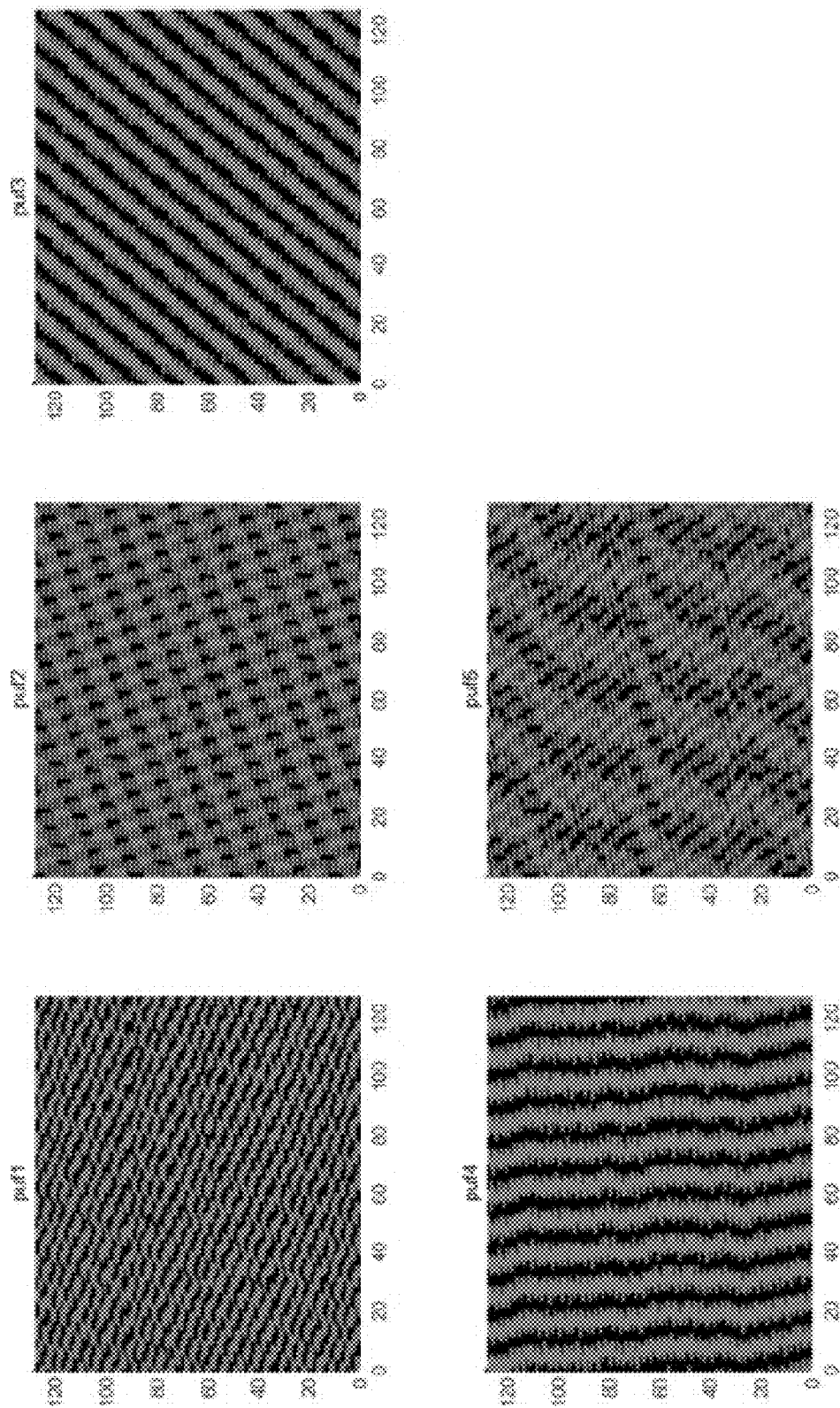
FIG. 7 is a graphical schematic diagram of a digital fingerprint generated by five digital control oscillators tracking the same input signal provided by an embodiment of the present disclosure.

FIG. 7 is a graphical schematic of the digital fingerprint generated by five digital control oscillators tracking the same pulse provided by an embodiment of the present disclosure. As shown in FIG. 7, the digital fingerprint generation circuit using 5 different digital control oscillator sub-circuits uses the same input signal to generate a graphical effect of digital fingerprint which has a unique graphical characteristic, where the black part of the figure represents 1 in the digital fingerprint bit stream, and the white part of the figure represents 0 in the digital fingerprint bit stream.

Figure 8:
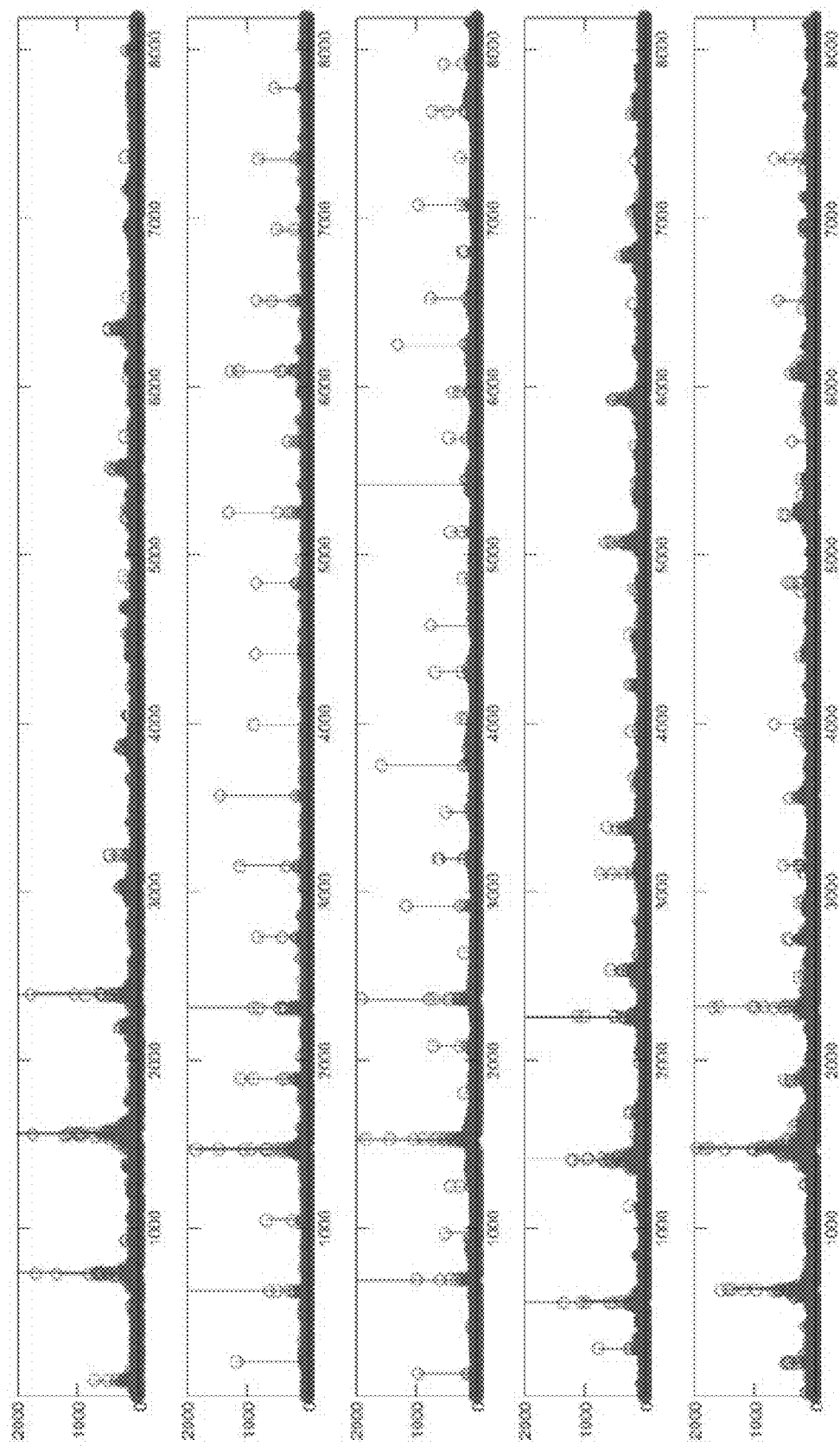
FIG. 8 is a schematic diagram after Fourier transform of the digital fingerprint generated by five digital control oscillators tracking the same input signal provided by an embodiment of the present disclosure.

FIG. 8 is a schematic diagram after Fourier transformation of the digital fingerprint generated by 5 digital control oscillators tracking the same pulse provided by an embodiment of the present disclosure. As shown in FIG. 8, the digital fingerprint generation circuit using five different digital control oscillator circuits uses the same input signal to generate a digital fingerprint yielding a characteristic image after Fourier transformation, where each circuit has unique digital features.

Combined with FIG. 8, it can be seen that the digital fingerprint generated by the digital fingerprint generation circuit using different digital control oscillator circuits for the same input signal has unique features.

Embodiments of the present disclosure also provide an electronic device that includes the digital fingerprint generation circuit provided by any of the above embodiments of the present disclosure.

It will be understood that the above embodiments are only exemplary embodiments for the purpose of illustrating the principle of the present disclosure. However, the present disclosure is not limited thereto. For those of ordinary skills in the art, various variations and improvements can be made without departing from the spirit and substance of the present disclosure, and these variations and improvements are also considered to be within the protection scope of the present disclosure.

The invention claimed is:

1. A digital fingerprint generation circuit, comprising:
   a pulse generation sub-circuit configured to generate a plurality of pulse signals;
   a digital control oscillator sub-circuit configured to generate an intermediate signal based on a frequency control signal and the plurality of pulse signals;
   a frequency dividing sub-circuit configured to divide the intermediate signal in frequency to generate a feedback signal;
   a frequency and phase detection sub-circuit configured to generate a digital fingerprint based on an input signal and the feedback signal, and further configured to generate a frequency indication signal indicating whether a frequency of the input signal is larger than a frequency of the feedback signal; and
   a control sub-circuit configured to generate the frequency control signal based on the frequency indication signal,
   wherein the input signal is a signal generated by a pulse generator, and
   wherein the input signal has a frequency not within an operating frequency range of the digital control oscillator sub-circuit.

2. The digital fingerprint generation circuit according to claim 1, wherein the frequency and phase detection sub-circuit is further configured to generate the frequency indication signal by generating a phase relationship indication signal between the input signal and the feedback signal.

3. The digital fingerprint generation circuit according to claim 1, wherein the pulse generation sub-circuit is a ring oscillator comprising a NAND gate.

4. The digital fingerprint generation circuit according to claim 1, wherein:
   the digital control oscillator sub-circuit comprises a logic control sub-circuit, an input terminal, and an output terminal;
   the logic control sub-circuit is configured to generate a selection signal based on the frequency control signal;
   the input terminal is configured to receive the plurality of pulse signals and the selection signal, and select and synthesize among the plurality of pulse signals based on the selection signal to generate a synthesized signal; and
   the output terminal comprises a trigger circuit configured to receive the synthesized signal and generate the intermediate signal based on the synthesized signal and a clock signal.

5. The digital fingerprint generation circuit according to claim 4, wherein:
   the logic control sub-circuit comprises a first adder, a second adder, a first register, a second register, a third register, and a fourth register;
   the input terminal comprises a first K→1 multiplexer, a second K→1 multiplexer and a 2→1 multiplexer, where K is an integer multiple of 2, the first K→1 multiplexer and the second K→1 multiplexer receive respectively K pulses output by the pulse generation sub-circuit, and the 2→1 multiplexer receives signals from the first K→1 multiplexer and the second K→1 multiplexer and also a first clock signal for synthesizing and sending to the output terminal; and
   the trigger circuit comprises a D flip-flop, a first inverter and a second inverter, where the D flip-flop receives a signal from the 2→1 multiplexer, the first inverter receives the first clock signal and outputs a signal to the D flip-flop, and the second inverter receives the first clock signal and outputs a second clock signal.

6. The digital fingerprint generation circuit according to claim 1, wherein the frequency and phase detection sub-circuit comprises:
   a first input terminal configured to receive the input signal;
   a second input terminal configured to receive the feedback signal;
   a frequency divider configured to divide the input signal in frequency;
   a register sub-circuit configured to obtain a plurality of signal values for an output signal from the frequency divider at a plurality of edges of the feedback signal;
   an output terminal configured to output the digital fingerprint; and a logic sub-circuit configured to perform logic operations on the plurality of signal values output by the register sub-circuit, and generate the frequency indication signal.

7. The digital fingerprint generation circuit according to claim 6, wherein:
the register sub-circuit comprises a first D flip-flop, a second D flip-flop, a third D flip-flop, and a fourth D flip-flop;
an input end of the first D flip-flop and an input end of the third D flip-flop are both connected to an output end of the frequency divider;
an input end of the second D flip-flop is connected to an output end of the first D flip-flop;
an input end of the fourth D flip-flop is connected to an output end of the third D flip-flop;
a clock end of the first D flip-flop, a clock end of the second D flip-flop and a clock end of the fourth D flip-flop are all connected to the second input terminal; and
a clock end of the third D flip-flop is connected to the second input terminal through a first NOT gate.

8. The digital fingerprint generation circuit according to claim 6, wherein:
the logic sub-circuit comprises a first logic sub-circuit and a second logic sub-circuit;
the first logic sub-circuit comprises a first XOR gate and a second XOR gate, wherein two input ends of the first XOR gate are respectively connected to an output end of the second D flip-flop and an output end of the fourth D flip-flop, two input ends of the second XOR gate are respectively connected to an output end of the first D flip-flop and an output end of the fourth D flip-flop, an output end of the second XOR gate is connected to the second output terminal, and an output end of the first XOR gate is connected to the third output terminal; and
the second logic sub-circuit comprises a second NOT gate, a third NOT gate, a first AND gate and a second AND gate, wherein two input ends of the first AND gate are respectively connected to the second output terminal and the third output terminal, one of input ends of the second AND gate is connected to the third output terminal through the second NOT gate, and the other of the output ends of the second AND gate is connected to the second output terminal through the third NOT gate.

9. The digital fingerprint generation circuit according to claim 6, wherein the register sub-circuit comprises a D flip-flop connected to the frequency divider, and the D flip-flop is configured to output the digital fingerprint based on an output signal of the frequency divider.

10. A digital fingerprint generation method, comprising:
inputting an input signal from outside;
generating a frequency indication signal indicating whether a frequency of the input signal is larger than a frequency of a feedback signal;
generating a frequency control signal based on the frequency indication signal;
generating an intermediate signal based on the frequency control signal and pulse signals;
dividing the intermediate signal in frequency to generate the feedback signal; and
generating a digital fingerprint based on the input signal and the feedback signal,
wherein the input signal is a signal generated by a pulse generator, and
wherein the input signal has a frequency not within an operating frequency range of a digital control oscillator sub-circuit.

11. The digital fingerprint generation method according to claim 10, wherein the frequency indication signal is generated by generating a phase relationship indication signal between the input signal and the feedback signal.

12. The digital fingerprint generation method according to claim 10, further comprising performing a Fourier transform on the digital fingerprint to generate a visualized digital fingerprint.

13. An electronic device, comprising:
a digital fingerprint generation circuit, wherein the digital fingerprint generation circuit comprises:
a pulse generation sub-circuit configured to generate a plurality of pulse signals;
a digital control oscillator sub-circuit configured to generate an intermediate signal based on a frequency control signal and the plurality of pulse signals;
a frequency dividing sub-circuit configured to divide the intermediate signal in frequency to generate a feedback signal;
a frequency and phase detection sub-circuit, configured to generate a digital fingerprint based on an input signal and the feedback signal, and further configured to generate a frequency indication signal indicating whether a frequency of the input signal is larger than a frequency of the feedback signal; and
a control sub-circuit configured to generate the frequency control signal based on the frequency indication signal,
wherein the input signal is a signal generated by a pulse generator, and
wherein the input signal has a frequency not within an operating frequency range of the digital control oscillator sub-circuit.

14. The electronic device according to claim 13, wherein the frequency and phase detection sub-circuit is further configured to generate the frequency indication signal by generating a phase relationship indication signal between the input signal and the feedback signal.

15. The electronic device according to claim 13, wherein the pulse generation sub-circuit is a ring oscillator comprising a NAND gate.

16. The electronic device according to claim 13, wherein:
the digital control oscillator sub-circuit comprises a logic control sub-circuit, an input terminal, and an output terminal;
the logic control sub-circuit is configured to generate a selection signal based on the frequency control signal;
the input terminal is configured to receive the plurality of pulse signals and the selection signal, and select and synthesize among the plurality of pulse signals based on the selection signal to generate a synthesized signal; and
the output terminal comprises a trigger circuit configured to receive the synthesized signal and generate the intermediate signal based on the synthesized signal and a clock signal.

17. The electronic device according to claim 13, wherein the frequency and phase detection sub-circuit comprises:
a first input terminal configured to receive the input signal;
a second input terminal configured to receive the feedback signal;
a frequency divider configured to divide the input signal in frequency;

a register sub-circuit configured to obtain a plurality of signal values for an output signal from the frequency divider at a plurality of edges of the feedback signal;

an output terminal configured to output the digital fingerprint; and a logic sub-circuit configured to perform logical operations on the plurality of signal values output by the register sub-circuit, and generate the frequency indication signal.

18. The electronic device according to claim 17, wherein the register sub-circuit comprises a D flip-flop connected to the frequency divider, wherein the D flip-flop is configured to output the digital fingerprint based on an output signal of the frequency divider.

\* \* \* \* \*